United States Patent [19]
Yifrach

[11] Patent Number: 5,329,320
[45] Date of Patent: Jul. 12, 1994

[54] TV RECEIVER AND BUFFER SYSTEM THEREFOR

[76] Inventor: Aharon Yifrach, 19 Ayalon Street, 78616 Ashkelon, Israel

[21] Appl. No.: 985,049

[22] Filed: Dec. 3, 1992

[51] Int. Cl.$^5$ .............................................. H04N 5/60
[52] U.S. Cl. ................... 348/738; 348/730; 358/343; 360/19.1
[58] Field of Search ...... 360/8, 9.1, 19.1, 18; 358/188, 198, 180, 143, 341, 343; 348/738, 725; H04N 5/60

[56] References Cited

U.S. PATENT DOCUMENTS

| | | | |
|---|---|---|---|
| 3,538,265 | 11/1970 | Keeler II | 179/100.11 |
| 3,576,406 | 4/1971 | Court et al. | 360/7 |
| 3,645,539 | 2/1972 | Jenkins | 360/7 |
| 4,031,548 | 6/1977 | Kato et al. | 358/188 |
| 4,268,724 | 5/1981 | Hubbard | 360/7 |
| 4,408,309 | 11/1983 | Kiesling et al. | 369/7 |
| 4,633,331 | 12/1986 | McGrady et al. | 360/7 |
| 4,805,217 | 2/1989 | Morihiro et al. | 369/7 |
| 4,841,574 | 6/1989 | Pham et al. | 381/31 |
| 4,851,909 | 7/1989 | Noske et al. | 358/198 |
| 4,965,569 | 10/1990 | Bennett et al. | 340/825.44 |
| 5,126,982 | 6/1992 | Yifrach | 360/7 |
| 5,164,839 | 11/1992 | Lang | 360/8 |

FOREIGN PATENT DOCUMENTS

9001838  2/1990  World Int. Prop. O. ......... 369/7

Primary Examiner—Mark R. Powell
Assistant Examiner—Jeffrey S. Murrell
Attorney, Agent, or Firm—Benjamin J. Barish

[57] ABSTRACT

A buffer system for TV receivers includes a cyclic storage device connectible to the demodulation circuits for continuously storing the audio and video signals last outputted thereby only over a predetemined time interval, enabling the viewer to jump-back to see a preceding portion of the TV broadcasts. In one described embodiment, the viewer normally sees the broadcasts in a real-time manner but may depress a button to see the broadcasts in a delayed-time manner via the cyclic storage device. In a second described embodiment, the viewer normally sees the broadcasts in a real-time manner, may depress a button to freeze a part of the broadcast in another storage device, and may later depress another button to play back the portion frozen.

16 Claims, 4 Drawing Sheets

TV RECEIVER AND BUFFER SYSTEM THEREFOR

FIELD AND BACKGROUND OF THE INVENTION

The present invention relates to TV receivers, and also to a buffer system for TV receivers.

It frequently happens that a person while watching TV wishes to see again a portion of the information just broadcast. This occurs especially when the viewer leaves the watching position for a short while, or when the viewer's attention is occupied in a conversation with another person. Should the viewer thus miss a part of a previously-broadcast information, such information is lost to the viewer unless the information is rebroadcast.

My prior U.S. Pat. No. 5,126,982 describes buffer systems for radio receivers. The present invention is directed to buffer systems for TV receivers.

OBJECTS AND BRIEF SUMMARY OF THE INVENTION

An object of the present invention is to provide a TV receiver, and particularly a buffer system for TV receivers, which permits the viewer to play back information which had been previously broadcast but not completely registered by the viewer.

According to the present invention, there is provided a buffer system for a TV receiver having processing circuitry outputting audio and video signals to audio and video analog/digital circuits for reproduction as sounds and pictures, the buffer system comprising: analog-to-digital converters for converting to digital form the analog signals outputted by the processing circuits; and a digital cyclic storage device connected to the demodulation circuits for continuously storing in digital form the audio and video signals last outputted thereby over a predetermined time interval. A control circuit is provided including mode selector means effective to control the buffer system to select either: (a) a Normal-Viewing Mode, wherein the audio and video circuits are connected to receive the audio and video signals from the demodulation circuits in a real-time manner, while the cyclic storage device continuously stores the audio and video signals last outputted by the demodulation circuits over a predetermined time interval; or (b) at least one other mode wherein the audio and video circuits are connected to receive the signals previously stored in the cyclic storage device. The buffer system further includes digital-to-analog converters for reconverting to analog form the signals received by the audio and video circuits from the cyclic storage device.

Such a buffer assembly thus permits the viewer normally to see the TV broadcast in a continuous manner; but whenever it is desired to resee information which was previously broadcast, this may be done by reading-out the contents of the cyclic storage device stored during the time interval corresponding to that in which the missed information was broadcast.

In one embodiment of the invention described below, the another mode is a Delayed-Viewing Mode, wherein the audio and video circuits are connected to receive the audio and video signals in a delayed-time manner from the processing circuitry via the cyclic storage device.

In a second described embodiment, the buffer system additionally includes a further storage device capable of storing all the information stored in the cyclic storage device during the predetermined time interval; and the mentioned at least one other mode includes: (a) a Freeze Mode, wherein the cyclic storage device is connected to the further storage device to transfer its contents at that instant to the further storage device while the cyclic storage device continues to store the audio and video signals last outputted by the demodulation circuits over the predetermined time interval; or (b) a Playback Mode, wherein the audio and video circuits are connected to the further storage device to be fed the contents of the further storage device.

The predetermined time interval in which information may be played back is preferably within the range of 10–180 seconds; in most cases, it would be about 30 seconds.

It would generally be desirable to construct the above-described buffer system in the form of a chip or a multi-chip module or printed-circuit board to be inserted into existing TV receivers for equipping them with the above-described capability of playing-back previously broadcast information which may have been missed. The buffer system could of course also be included in TV receivers as originally constructed; therefore, according to another aspect of the invention, there is provided a TV receiver having a demodulation circuit, an audio and video circuit, and a buffer circuit as described above inserted between the demodulation and audio and video circuits.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
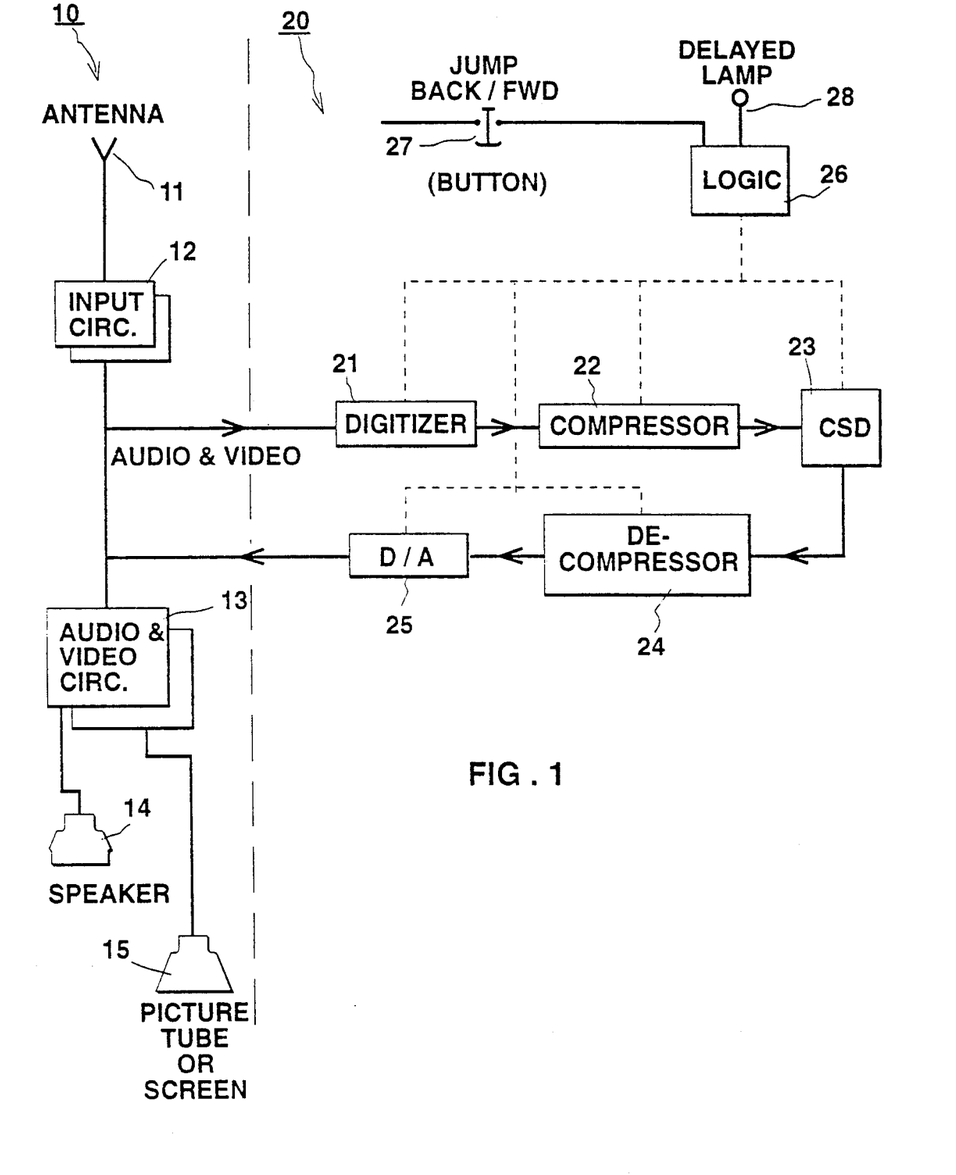
FIG. 1 is a block diagram illustrating one form of buffer system constructed in accordance with the present invention.

The Embodiment of FIG. 1

The buffer system illustrated in FIG. 1 is adapted to be included in a conventional TV receiver, generally designated 10, for equipping the receiver with the capability of playing back previously broadcast information. The TV receiver 10, which may be of any conventional construction, includes an antenna 11 for receiving the RF signals, an input circuit 12, usually including an RF amplifying circuit, a demodulation circuit for extracting the audio and video signals from the carrier, and audio and video circuits 13 for amplifying and further processing the audio and video signals before they are reproduced as sounds in the speaker 14, and pictures in the tube or screen 15.

According to the present invention, the TV receiver 10 illustrated in FIG. 1 is equipped with a buffer assembly, generally designated 20, inserted between the input circuit 12 and the audio and video circuits 13.

The buffer system 20 illustrated in FIG. 1 comprises: a digitizer 21, namely an analog-to-digital converter, for converting the audio and video analog signals from the input circuit 12 to digital form; a compressor 22 for compressing the large amount of digital information into a smaller volume of memory; a cyclic storage device 23 for continuously storing the compressed audio and video signals last outputted from input circuit 12 via digitizer 21 and compressor 22; a decompressor 24 for expanding the compressed information stored in the cyclic storage device 23; and a digital-to-analog converter 25 for reconverting to analog form the output from the cyclic storage device 23 and decompressor 24 before such output is fed to the audio and video circuits 13 of the receiver.

The cyclic storage device 23 is a digital storage device, such as a RAM (random access memory) having a storage capacity for continuously storing the compressed audio and video signals last outputted by the compressor 22 over a predetermined time interval. This time interval may be preselected for each particular application and would usually be within the range of 10-180 seconds, a preferred time interval being about 30 seconds.

The buffer system 20 illustrated in FIG. 1 further includes a control system comprising a logic circuit 26 and a mode-selector switch in the form of a JB/F (Jump Back/Forward) button 27 conected to the logic circuit 26 which selects either of the following two modes of operation of the buffer system:

(a) When the JB/F button 27 is not depressed, logic circuit 26 selects a Normal-Viewing Mode, wherein the audio and video circuits 13 are connected to receive the audio and video signals from the input circuit 12 in a real-time manner, while the cyclic storage device 23 continuously stores the compressed audio and video signals last outputted by the compressor circuit over a predetermined time interval.

(b) When the JB/F button 27 is depressed, it selects a Delayed-Viewing Mode, wherein the logic circuit 26 connects the audio and video circuits 13 to receive the decompressed audio and video signals in a delayed-time manner from the input circuit 12 via the cyclic storage device 23 and the compression/decompression process.

(c) When the JB/F button 27 is next depressed, logic circuit 26 returns the system to the Normal-Viewing Mode.

Buffer system 20 further includes an indicator lamp 28 controlled by the logic circuit 26 such that the indicator lamp is not energized in the Normal-Viewing Mode, but is energized in the Delayed-Viewing Mode.

The system illustrated in FIG. 1 operates as follows:

Normally, the JB/F button 27 is not depressed, in which case the system operates according to the Normal-Viewing Mode. In this mode, the audio and video circuits 13 are connected to receive the audio and video signals from the input circuit 12 in a real-time manner, so that the viewer sees the TV broadcasts in real-time. At the same time, the cyclic storage device continuously stores the compressed audio and video signals last outputted by the compressor 22 over a predetermined time interval, e.g., the last 30 seconds. During this Normal-Viewing mode of operation, indicator lamp 28 is not energized.

Should the viewer wish to resee information which had just been broadcast, the viewer depresses the JB/F button 27. This causes the logic circuit 26 to switch the system from the Normal-Viewing Mode to the Delayed-Viewing Mode. In this mode, the audio and video circuits 13 are connected to receive the audio and video signals in a delayed-time manner from the digital-to-analog circuit 25 via the cyclic storage device 23 and the decompressor 24, so that the viewer sees the broadcast not in real-time, but rather in a 30-second delayed time. Thus, the viewer will resee the information previously broadcast within the past 30 seconds, and from then on in a 30-second delayed time.

At any time thereafter, the viewer may depress the JB/F button again, whereupon the logic circuit 26 reswitches the system back to the Normal-Viewing Mode. The audio and video circuits 13 are then reconnected to receive the audio and video signals from the input circuit 12 in a real-time manner. The cyclic storage device 23, however, continuously stores the compressed audio and video signals last outputted by the compressor circuit over the 30-second time interval, so that this information is again available to the viewer whenever desired by again depressing the JB/F button.

When indicator lamp 28 is not energized, this indicates to the viewer that the system is in the Normal-Viewing Mode and the broadcasts are being seen in a real-time manner; whereas when indicator lamp 28 is energized, this indicates that the system is in the Delayed-Viewing Mode wherein the broadcasts are being seen in a delayed-time manner.

Figure 2:
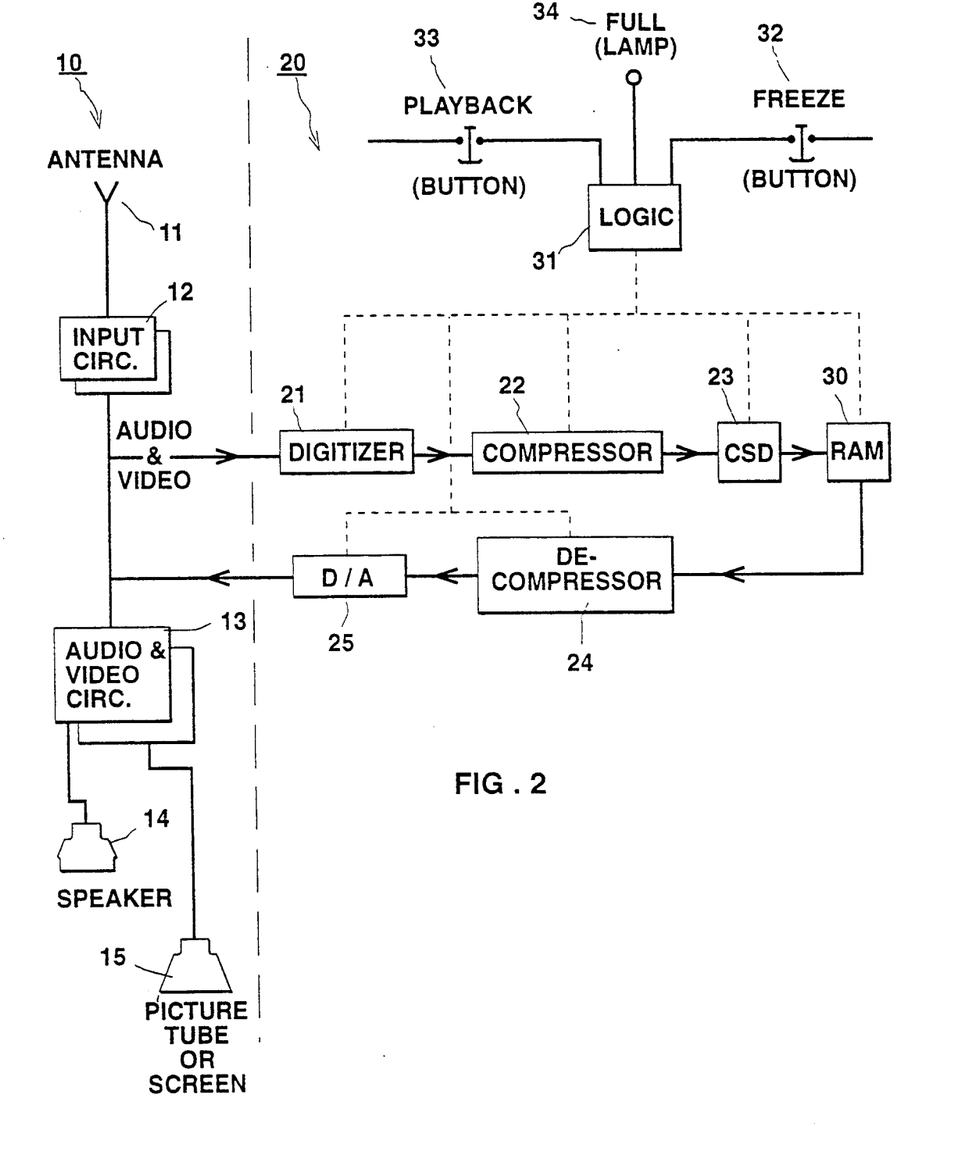
FIG. 2 is a block diagram illustrating a second form of buffer system constructed in accordance with the invention.

The Embodiment of FIG. 2

The buffer system illustrated in FIG. 2 is very similar to that of FIG. 1, except that it enables the viewer not only to see the TV broadcasts in a real-time manner, but also to freeze a portion of the broadcast for later playback whenever desired.

Thus, the buffer system illustrated in FIG. 2 includes all the elements of the conventional TV receiver 10, which elements have been correspondingly numbered. It also includes the digitizer 21, compressor 22, cyclic storage device 23, decompressor 24, and digital-to-analog converter 25 of the buffer system 20, which elements have also been correspondingly numbered. However, the system of FIG. 2 includes, in addition, a further storge device 30, and a different logic circuit 31 controlled by two depressible buttons, namely a Freeze button 32, and a Playback button 33. The further storage device 30, in the form of another RAM, is capable of storing all the information stored in the cyclic storage device 23. An indicator lamp 34 is controlled by the logic circuit 31. Logic circuit 31 is in turn controlled by the two buttons 32 and 33, in the following manner:

(a) When neither Freeze button 32 or Playback button 33 is depressed, the logic circuit 31 operates the system according to the Normal-Viewing Mode wherein, as described above with respect to the FIG. 1 embodiment, the audio and video circuits 13 are connected to receive the audio and video signals from the input circuits 12 in a real-time manner, while the cyclic storage device 23 continuously stores the compressed audio and video signals last outputted by the compressor circuit 22 over a predetermined time interval, e.g., 30 seconds.

(b) When the Freeze button 32 is depressed, it controls the logic circuit 31 to select a Freeze Mode. In this mode, the cyclic storage device 23 is connected to the further storage device 30 to transfer its contents at that instant to the further storage device. That is, the last 30 seconds of the broadcast are thus "frozen" in the further storage device 30, while the cyclic storage device 23 continues to store the compressed audio and video signals last outputted by the compressor circuit 22 over the predetermined 30-second time interval. If the Freeze Button 32 should be again depressed, the logic circuit 31 causes the previous contents of the further storage device 30 to be replaced by the contents of the cyclic storage device 23, i.e., the last 30 seconds of the broadcast. The viewer, however, continues to see the broadcasts in a real-time manner.

(c) Now whenever the viewer wishes to play back the 30 seconds of broadcast "frozen" by depressing the Freeze button 32, this is effected by depressing the Playback button 33, which controls the logic circuit 31 to select the Playback Mode. In this mode, the audio and video circuits 13 are connected to the further storage device 30 via the decompressor 24 to receive its contents, thereby playing back to the viewer the 30 seconds of broadcast frozen in that device. After the contents of the further storage device 30 have been expanded and fed to the audio and video circuits 13, the system automatically returns to the Normal-Viewing Mode.

Indicator lamp 34 is controlled by the logic circuit 31 such that: (a) it is not energized in the Normal-Viewing Mode; (b) it is energized in the Freeze Mode, and (c) it is caused to "blink" in the Playback Mode.

Figure 3:
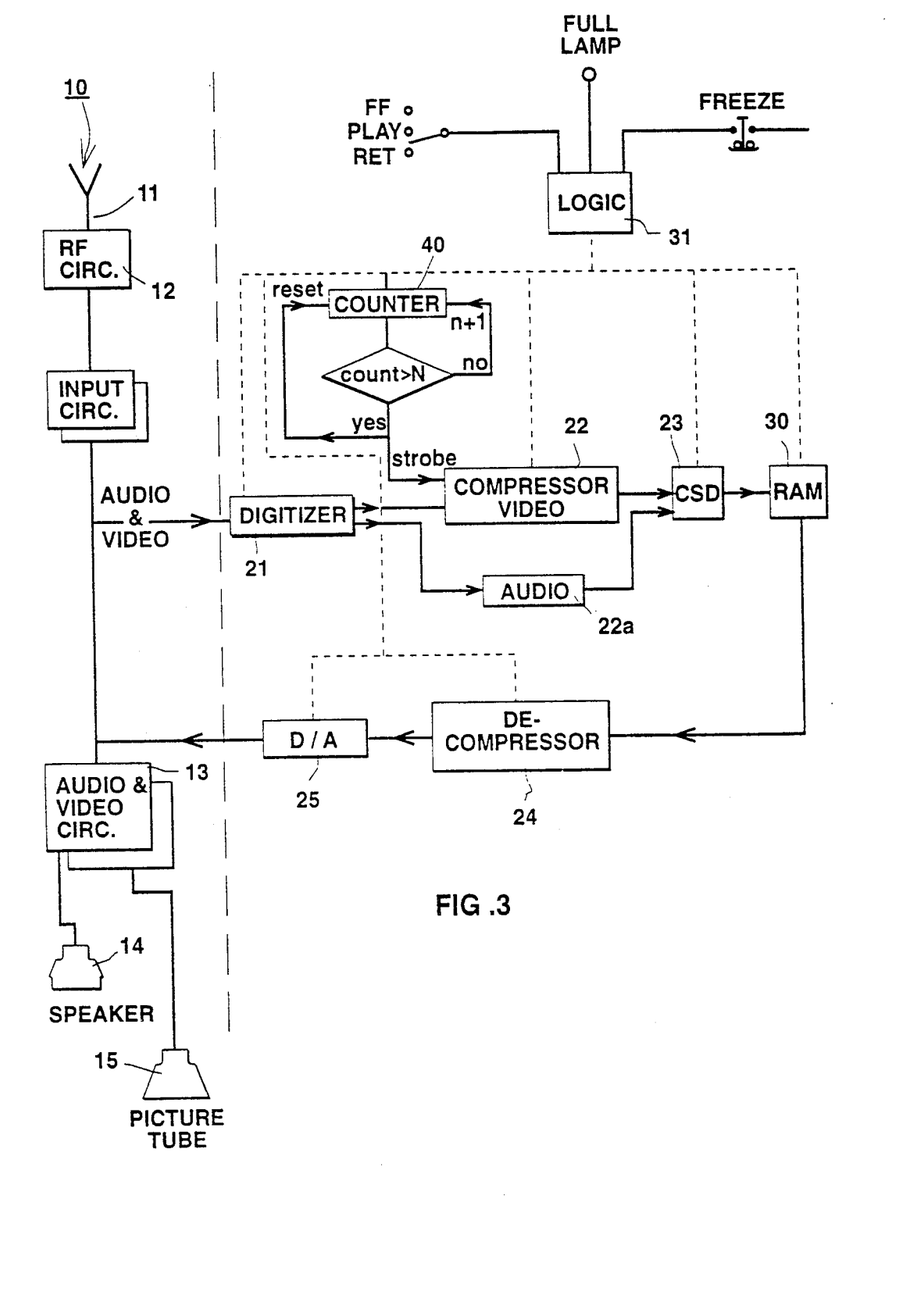
FIG. 3 illustrates a modification of the system of FIG. 2 to provide dilution of the pictures.

The Embodiment of FIG. 3

The buffer system illustrated in FIG. 3 is very similar to that of FIG. 2, except that the video signals are stored in a "diluted" manner, while the audio signals are stored in a continuous manner, such that the restored video will be displayed to the viewer as a sequence of still pictures, rather than as a continuous moving picture, while the audio will be heard normally in a continuous manner.

Thus, as shown in FIG. 3, the logic circuit 31 "triggers" the video compressor 22 for compressing the captured frames only once in N-cycles as determined by a counter 40, before being stored in the cyclic storage device 23. During playback, the frames stored in the cyclic storage device are fed to the digital-to-analog converter 25 via the decompressor 24 at the same cyclic rate as stored in the cyclic storage device, so that the video is displayed as a sequence of still pictures. The audio signals, however, are fed to the cyclic storage device via a separate audio channel 22a, so that the audio signals are stored and replayed in a regular, continuous manner.

The remainder of the system illustrated in FIG. 3 is constructed, and operates in the same manner, as the system of FIG. 2.

Figure 4:
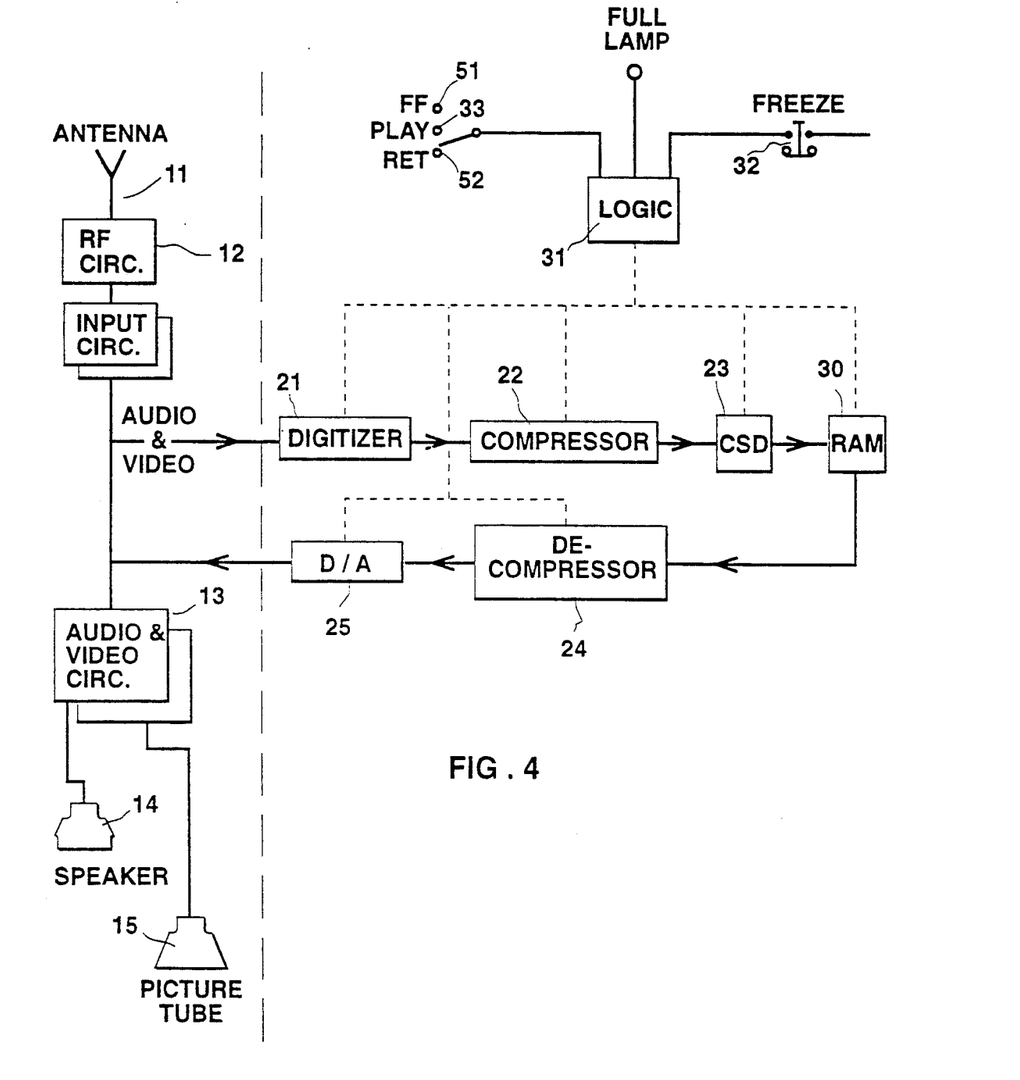
FIG. 4 illustrates another modification of the system of FIG. 2 to provide fast forward and repeat operations.

The Embodiment of FIG. 4

The buffer system illustrated in FIG. 4 is also similar to that of FIG. 2, except that the logic control circuit includes, in addition to the Freeze button 32 and the Playback button 33 described above, also a Fast Forward button 51 and a Return button 52. The Fast Forward button 51 is effective to produce a fast forward reproduction of the audio and video signals stored in the cyclic storage device 23; whereas the Return button 52 is effective to return to a selected portion of the audio and video signals stored in the cyclic storage device 23 for reproduction.

Thus, the viewer can control the timing of the playback of the "captured" video and audio signals stored in the cyclic storage device 23 in substantially the same manner as in a video cassette recorder. For example, if the viewer wishes to see a specific part of the captured data, the Fast Forward button 51 can be depressed to produce a fast forward advance to the audio and video signals stored in the cyclic storage device 23; and if the viewer wishes to see again a portion of the captured data, the Return button 52 may be depressed to return to a selected portion of the audio and video signals stored in the cyclic storage device for reproduction. The system illustrated in FIG. 4 is otherwise constructed, and operates in the same manner, as the system of FIG. 2.

While the "dilution" feature of FIG. 3, and the Fast Forward and Return features of FIG. 4, are described with respect to the buffer system illustrated in FIG. 2, it will be appreciated that they could also be used in the buffer system illustrated in FIG. 1.

It will also be appreciated that the depressible buttons in all of the above-described systems can be located on a dedicated remote-control unit, or as additional buttons on the TV remote-control unit. Also, the input to the TV system can be from a cable-TV system, rather than from an antenna. Further, the circuits of the TV receiver described can be digital as well as analog.

Many other variations, modifications and applications of the invention may be made.

What is claimed is:

1. A buffer system for TV receivers having processing circuitry outputting audio and video analog signals to audio and video circuits for reproduction as sounds and pictures, said buffer system comprising:

an analog-to-digital converter for converting the analog audio and video signals outputted by said processing circuitry to digital audio and video signals;

an electronic compressor for compressing the digital output of the analog-to-digital converter into a much smaller volume of digital information;

a digital cyclic storage device connected to said compressor for continuously storing in digital form the compressed audio and video signals last outputted thereby over a predetermined time interval;

an electronic decompressor for expanding the compressed signals stored in the cyclic storage device;

a control circuit including a mode selector effective to control said buffer system to select:

(a) a Normal-Viewing Mode, wherein the audio and video circuits are connected to receive the audio and video signals from the processing circuitry in a real-time manner, while the cyclic storage device continuously stores the compressed audio and video signals last outputted by the compressor over a predetermined time interval;

or (b) at least one other mode wherein the audio and video circuits are connected to receive via said decompressor the signals previously stored in the cyclic storage device; said at least one other mode including a Delayed Viewing Mode, wherein the audio and video circuits are connected to receive the audio and video signals in a delayed-time manner from the processing circuitry via said cyclic storage device;

and a digital-to-analog converter for reconverting to analog form the signals received by the audio and video circuits from said cyclic storage device, via the decompressor.

2. The buffer system according to claim 1, wherein said predetermined time interval is within the range of 10 to 180 seconds.

3. The buffer system according to claim 1, wherein said control circuit controls the compressor to store the video signals as a sequence of still pictures at a frequency of 0.5 to 20 Hz, and to store the audio signals continuously.

4. A buffer system for TV receivers having processing circuitry outputting audio and video analog signals to audio and video circuits for reproduction as sounds and pictures, said buffer system comprising:
  an analog-to-digital converter for converting the analog audio and video signals outputted by said processing circuitry to digital audio and video signals;
  an electronic compressor for compressing the digital output of the analog-to-digital converter into a much smaller volume of digital information;
  a digital cyclic storage device connected to said compressor for continuously storing in digital form the compressed audio and video signals last outputted thereby over a predetermined time interval;
  an electronic decompressor for expanding the compressed signals stored in the cyclic storage device;
  a control circuit including a mode selector effective to control said buffer system to select;
    (a) a Normal-Viewing Mode, wherein the audio and video circuits are connected to receive the audio and video signals from the processing circuit in a real-time manner, while the cyclic storage device continuously stores the compressed audio and video signals last outputted by the compressor over a predetermined time interval;
    or (b) at least one other mode wherein the audio and video circuits are connected to receive via said decompressor the signals previously stored in the cyclic storage device;
  and a digital-to-analog converter for reconverting to analog form the signals received by the audio and video circuits from said cyclic storage device, via the decompressor;
  said buffer system further including a further storage device capable of storing all the information stored in the cyclic storage device during the predetermined time interval;
  and said at least one other mode including:
    (i) a Freeze Mode, wherein the cyclic storage device is connected to the further storage device to transfer its contents at that instant to the further storage device while the cyclic storage device continues to store the audio and video signals last outputted by the demodulation circuits over the predetermined time interval;
    or (ii) a Playback Mode, wherein the audio and video circuits are connected to the further storage device to be fed the contents of the further storage device.

5. The buffer system according to claim 4, wherein said Playback Mode is also effective automatically to return the system to the Normal-Viewing Mode after the contents of the further storage device have been fed to the audio and video circuits, via the decompressor.

6. The buffer system according to claim 5, wherein said mode selector means comprises first and second depressible buttons controlling said control system such that:
  (a) when both buttons are not depressed, the mode selector means selects the Normal-Viewing Mode;
  (b) when said first button is depressed, the mode selector means selects the Freeze Mode; and
  (c) when said second button is depressed, the mode selector means selects the Playback Mode.

7. The buffer system according to claim 4, further including an indicator lamp, said control circuit energizing said indicator lamp in the Freeze Mode and blinking said indicator lamp in the Playback Mode.

8. A buffer system for TV receivers having processing circuitry outputting audio and video analog signals to audio and video circuits for reproduction as sounds and pictures, said buffer system comprising;
  an analog-to-digital converter for converting the analog audio and video signals outputted by said processing circuitry to digital audio and video signals;
  an electronic compressor for compressing the digital output of the analog-to-digital converter into a much smaller volume of digital information;
  a digital cyclic storage device connected to said compressor for continuously storing in digital form the compressed audio and video signals last outputted thereby over a predetermined time interval;
  an electronic decompressor for expanding the compressed signals stored in the cyclic storage device;
  a control circuit including a mode selector effective to control said buffer system to select;
    (a) a Normal-Viewing Mode, wherein the audio and video circuits are connected to receive the audio and video signals from the processing circuit in a real-time manner, while the cyclic storage device continuously stores the compressed audio and video signals last outputted by the compressor over a predetermined time interval;
    or (b) at least one other mode wherein the audio and video circuits are connected to receive via said decompressor the signals previously stored in the cyclic storage device;
  and a digital-to-analog converter for reconverting to analog form the signals received by the audio and video circuits from said cyclic storage device, via the decompressor;
  said control circuit further including a Fast Forward button effective to produce a fast forward advance to the audio and video signals stored in the cyclic storage device, and a Return button effective to return to a selected portion of the audio and video signals stored in the cyclic storage device for reproduction.

9. A TV receiver comprising:
  input circuits connected to an antenna outputting audio and video signals;
  audio and video circuits for reproducing the audio and video signals in the form of sounds and pictures;
  and a buffer system including:
  an analog-to-digital converter for converting the audio and video analog signals outputted by said audio and video circuits to digital audio and video signals;
  an electronic compressor for compressing the digital output of the analog-to-digital converter into a much smaller volume of digital information;

a digital cyclic storage device connected to the compressor for continuously storing the compressed audio and video signals last outputted thereby over a predetermined time interval;

an electronic decompressor for expanding the compressed signals stored in the cyclic storage device;

a control circuit including a mode selector effective to control said buffer system to select:

(a) a Normal-Viewing Mode, wherein the audio and video circuits are connected to receive the audio and video signals from the processing circuit in a real-time manner, while the cyclic storage device continuously stores the compressed audio and video signals last outputted by the compressor over a predetermined time interval;

or (b) at least one other mode wherein the audio and video circuits are connected to receive via said decompressor the signals previously stored in the cyclic storage device; said at least one other mode including a Delayed Viewing Mode, wherein the audio and video circuits are connected to receive the audio and video signals in a delayed-time manner from the processing circuitry via said cyclic storage device;

and a digital-to-analog converter for reconverting to analog form the signals received by the audio and video circuits from said cyclic storage device, via the 10. A TV receiver comprising:

input circuits connected to an antenna outputting audio and video signals;

audio and video circuits for reproducing the audio and video signals in the form of sounds and pictures;

and a buffer system including:

an analog-to-digital converter for converting the audio and video analog signals outputted by said audio and video circuits to digital audio and video signals;

an electronic compressor for compressing the digital output of the analog-to-digital converter into a much smaller volume of digital information;

a digital cyclic storage device connected to the compressor for continuously storing the compressed audio and video signals last outputted thereby over a predetermined time interval;

an electronic decompressor for expanding the compressed signals stored in the cyclic storage device;

a control circuit including a mode selector effective to control said buffer system to select:

(a) a Normal-Viewing Mode, wherein the audio and video circuits are connected to receive the audio and video signals from the processing circuit in a real-time manner, while the cyclic storage device continuously stores the compressed audio and video signals last outputted by the compressor over a predetermined time interval;

or (b) at least one other mode wherein the audio and video circuits are connected to receive via said decompressor the signals previously stored in the cyclic storage device;

and a digital-to-analog converter for reconverting to analog form the signals received by the audio and video circuits from said cyclic storage device, via the decompressor; wherein:

the buffer system further includes a further storage device capable of storing all the information stored in the cyclic storage device during the predetermined time interval;

and said at least one other mode includes:

(i) a Freeze Mode, wherein the cyclic storage device is connected to the further storage device to transfer its contents at that instant to the further storage device while the cyclic storage device continues to store the audio and video signals last outputted by the demodulation circuits over the predetermined time interval;

or (ii) a Playback Mode, wherein the audio and video circuits are connected to the further storage device to be fed the contents of the further storage device.

11. The TV receive according to claim 10, wherein said Playback Mode is also effective automatically to return the system to the Normal-Viewing Mode after the contents of the further storage device have been fed to the audio and video circuits.

12. The TV receiver according to claim 10, wherein said mode selector means comprises first and second depressible buttons controlling said control system such that:

(a) when both buttons are not depressed, the mode selector means selects the Normal-Viewing Mode;

(b) when said first button is depressed, the mode selector means selects the Freeze Mode; and (c) when said second button is depressed, the mode selector means selects the Playback Mode.

13. The TV receiver according to claim 10, further including an indicator lamp, said control circuit energizing said indicator lamp in the Freeze Mode and blinking said indicator lamp in the Playback Mode.

14. The TV receiver according to claim 10, wherein said predetermined time interval is within the range of 10 to 180 seconds.

15. A TV receiver comprising:

input circuits connected to an antenna outputting audio and video signals;

audio and video circuits for reproducing the audio and video signals in the form of sounds and pictures;

and a buffer system including:

an analog-to-digital converter for converting the audio and video analog signals outputted by said audio and video circuits to digital audio and video signals;

an electronic compressor for compressing the digital output of the analog-to-digital converter into a much smaller volume of digital information;

a digital cyclic storage device connected to the compressor for continuously storing the compressed audio and video signals last outputted thereby over a predetermined time interval;

an electronic decompressor for expanding the compressed signals stored in the cyclic storage device;

a control circuit including a mode selector effective to control said buffer system to select:

(a) a Normal-Viewing Mode, wherein the audio and video circuits are connected to receive the audio and video signals from the processing circuit in a real-time manner, while the cyclic storage device continuously stores the compressed audio and video signals last outputted by the compressor over a predetermined time interval;

or (b) at least one other mode wherein the audio and video circuits are connected to receive via said decompressor the signals previously stored in the cyclic storage device;

and a digital-to-analog converter for reconverting to analog form the signals received by the audio and video circuits from said cyclic storage device, via the decompressor;

wherein said control circuit controls the compressor to store the video signals as a sequence of still pictures at a frequency of 0.5 to 20 Hz, and to store the audio signals continuously.

16. A TV receiver comprising:

input circuits connected to an antenna outputting audio and video signals;

audio and video circuits for reproducing the audio and video signals in the form of sounds and pictures;

and a buffer system including:

an analog-to-digital converter for converting the audio and video analog signals outputted by said audio and video circuits to digital audio and video signals;

an electronic compressor for compressing the digital output of the analog-to-digital converter into a much smaller volume of digital information;

a digital cyclic storage device connected to the compressor for continuously storing the compressed audio and video signals last outputted thereby over a predetermined time interval;

an electronic decompressor for expanding the compressed signals stored in the cyclic storage device;

a control circuit including a mode selector effective to control said buffer system to select:

(a) a Normal-Viewing Mode, wherein the audio and video circuits are connected to receive the audio and video signals from the processing circuit in a real-time manner, while the cyclic storage device continuously stores the compressed audio and video signals last outputted by the compressor over a predetermined time interval;

or (b) at least one other mode wherein the audio and video circuits are connected to receive via said decompressor the signals from said cyclic storage device, via the decompressor;

wherein said control circuit further includes a Fast Forward button effective to produce a fast forward reproduction of the audio and video signals stored in the cyclic storage device, and a Return button effective to return to a selected portion of the audio and video signals stored in the cyclic storage device for reproduction.

* * * * *